(12) United States Patent
Chi et al.

(10) Patent No.: US 10,447,064 B2
(45) Date of Patent: Oct. 15, 2019

(54) WIRELESS CHARGING SYSTEM AND WIRELESS CHARGING METHOD

(71) Applicant: Kinpo Electronics, Inc., New Taipei (TW)

(72) Inventors: Shou-Wei Chi, New Taipei (TW); Ming-Hsun Chiang, New Taipei (TW); Chi-Chang Tung, New Taipei (TW); Ting-Shuo Chen, New Taipei (TW)

(73) Assignee: Kinpo Electronics, Inc., New Taipei (TW)

( * ) Notice: Subject to any disclaimer, the term of this patent is extended or adjusted under 35 U.S.C. 154(b) by 28 days.

(21) Appl. No.: 15/654,729

(22) Filed: Jul. 20, 2017

(65) Prior Publication Data

US 2019/0006874 A1 Jan. 3, 2019

(30) Foreign Application Priority Data

Jun. 28, 2017 (CN) .......................... 2017 1 0507059

(51) Int. Cl.
*H02J 7/02* (2016.01)
*H02J 50/10* (2016.01)
*H04B 5/00* (2006.01)
*H02J 50/90* (2016.01)
*H02J 7/00* (2006.01)

(52) U.S. Cl.
CPC .............. *H02J 7/025* (2013.01); *H02J 50/10* (2016.02); *H02J 50/90* (2016.02); *H04B 5/0037* (2013.01); *H04B 5/0087* (2013.01); *H02J 7/0042* (2013.01)

(58) Field of Classification Search
CPC .. H02J 7/025; H02J 50/10; H02J 50/90; H02J 7/0042; H04B 5/0087; H04B 5/0037
See application file for complete search history.

(56) References Cited

U.S. PATENT DOCUMENTS

| | | | | |
|---|---|---|---|---|
| 5,821,731 A | * | 10/1998 | Kuki ................... | B60L 11/1805 320/108 |
| 8,305,036 B2 | * | 11/2012 | Toya ....................... | H02J 7/025 320/108 |
| 8,362,744 B2 | * | 1/2013 | Terao ...................... | H01F 38/14 320/108 |
| 8,410,751 B2 | * | 4/2013 | Terao ...................... | H01F 38/14 320/108 |
| 8,525,471 B2 | * | 9/2013 | Thorsell ................. | B60N 3/002 320/107 |

(Continued)

FOREIGN PATENT DOCUMENTS

| | | |
|---|---|---|
| EP | 2608354 | 6/2013 |
| EP | 2903122 | 8/2015 |
| WO | 2015088108 | 6/2015 |

OTHER PUBLICATIONS

"Search Report of Europe Counterpart Application", dated Apr. 11, 2018, p. 1-p. 8.

*Primary Examiner* — Nha T Nguyen
(74) *Attorney, Agent, or Firm* — JCIPRNET

(57) ABSTRACT

The invention provides a wireless charging system and a wireless charging method. The method includes: sending a first control signal by a processor; moving a wireless charging apparatus to a first position near an electronic apparatus according to a first control signal by a moving platform; and wirelessly charging the electronic apparatus by the wireless charging apparatus.

12 Claims, 3 Drawing Sheets

(56) References Cited

U.S. PATENT DOCUMENTS

| | | | |
|---|---|---|---|
| 8,907,619 B2* | 12/2014 | Shukuya | G12B 5/00 |
| | | | 320/108 |
| 9,853,484 B2* | 12/2017 | Iwabuchi | H02J 7/0044 |
| 9,859,730 B2* | 1/2018 | Tojo | H02J 5/005 |
| 10,063,107 B2* | 8/2018 | Makwinski | H02J 7/0042 |
| 10,090,718 B2* | 10/2018 | Yamanishi | H02J 17/00 |
| 2008/0258679 A1 | 10/2008 | Manico et al. | |
| 2009/0079387 A1* | 3/2009 | Jin | H02J 7/0004 |
| | | | 320/108 |
| 2009/0153098 A1* | 6/2009 | Toya | H02J 7/025 |
| | | | 320/108 |
| 2009/0278505 A1* | 11/2009 | Toya | H01M 10/052 |
| | | | 320/152 |
| 2010/0156347 A1 | 6/2010 | Lee et al. | |
| 2010/0213894 A1* | 8/2010 | Sip | B60L 11/1829 |
| | | | 320/108 |
| 2010/0270970 A1* | 10/2010 | Toya | H02J 7/0027 |
| | | | 320/108 |
| 2010/0315038 A1* | 12/2010 | Terao | H01F 38/14 |
| | | | 320/108 |
| 2011/0074344 A1* | 3/2011 | Park | H01F 38/14 |
| | | | 320/108 |
| 2012/0119708 A1* | 5/2012 | Toya | H01F 38/14 |
| | | | 320/137 |
| 2012/0326659 A1* | 12/2012 | Shukuya | H02J 7/0044 |
| | | | 320/108 |

* cited by examiner

WIRELESS CHARGING SYSTEM AND WIRELESS CHARGING METHOD

CROSS-REFERENCE TO RELATED APPLICATION

This application claims the priority benefit of China application serial no. 201710507059.3, filed on Jun. 28, 2017. The entirety of the above-mentioned patent application is hereby incorporated by reference herein and made a part of this specification.

BACKGROUND

Field of the Invention

The invention relates to a wireless charging system and a wireless charging method.

Description of Related Art

Generally speaking, a user, when desiring to charge an electronic apparatus by using a wireless charging apparatus, has to place the electronic apparatus near the wireless charging apparatus on his/her own (manually), thereby charging the electronic apparatus by the wireless charging apparatus. However, when the user is not aware of a position of the wireless charging apparatus, it would cause inconvenience to the use of the wireless charging apparatus, instead.

SUMMARY

Accordingly, the invention provides a wireless charging system and a wireless charging method capable of directly placing a cell phone on a placement platform for charging in a condition that a user is not aware of a position of a wireless charging apparatus.

According to an embodiment of the invention, a wireless charging system including a placement platform, a wireless charging apparatus, a moving platform and a processor is provided. The moving platform is connected with the wireless charging apparatus. The processor is coupled to the wireless charging apparatus and the moving platform. The placement platform includes a placement plane for placing an electronic apparatus. The processor sends a first control signal. The moving platform moves the wireless charging apparatus to a first position near the electronic apparatus according to the first control signal. The wireless charging apparatus wirelessly charges the electronic apparatus.

According to an embodiment of the invention, a wireless charging method for a wireless charging system is provided. The system includes a placement platform, a wireless charging apparatus, a moving platform and a processor. The moving platform is connected with the wireless charging apparatus. The placement platform includes a placement plane for placing an electronic apparatus. The method includes: sending a first control signal by the processor; moving the wireless charging apparatus to a first position near the electronic apparatus according to the first control signal by the moving platform; and wirelessly charging the electronic apparatus by the wireless charging apparatus.

Based on the above, in the wireless charging system and the wireless charging method provided by the invention, the wireless charging apparatus and the moving platform can be integrated in a placement platform. When the electronic apparatus is placed on the placement plane of the placement platform, the moving platform can move the wireless charging apparatus to a position near the electronic apparatus by the control signal of the processor. Thereafter, the wireless charging apparatus can charge the electronic apparatus. In this way, the user, unknowing the position of the wireless charging apparatus, can directly place the cell phone on the placement platform for charging.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1A:
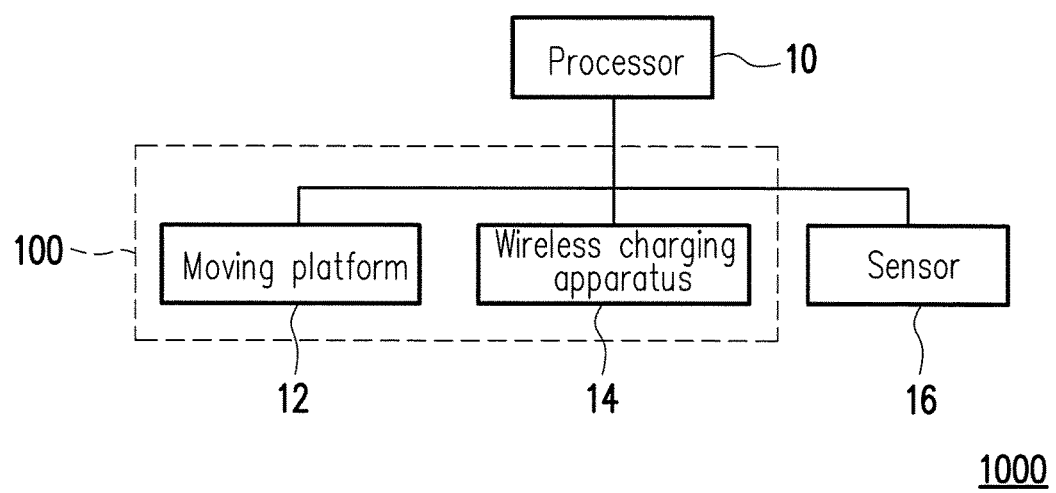
FIG. 1A and FIG. 1B are schematic diagrams illustrating a wireless charging system according to an embodiment of the invention.

Reference will now be made in detail to the exemplary embodiments of the invention, examples of which are illustrated in the accompanying drawings. Wherever possible, elements/components using the same reference numbers in the drawings and the description refer to the same or like parts.

Figure 1B:
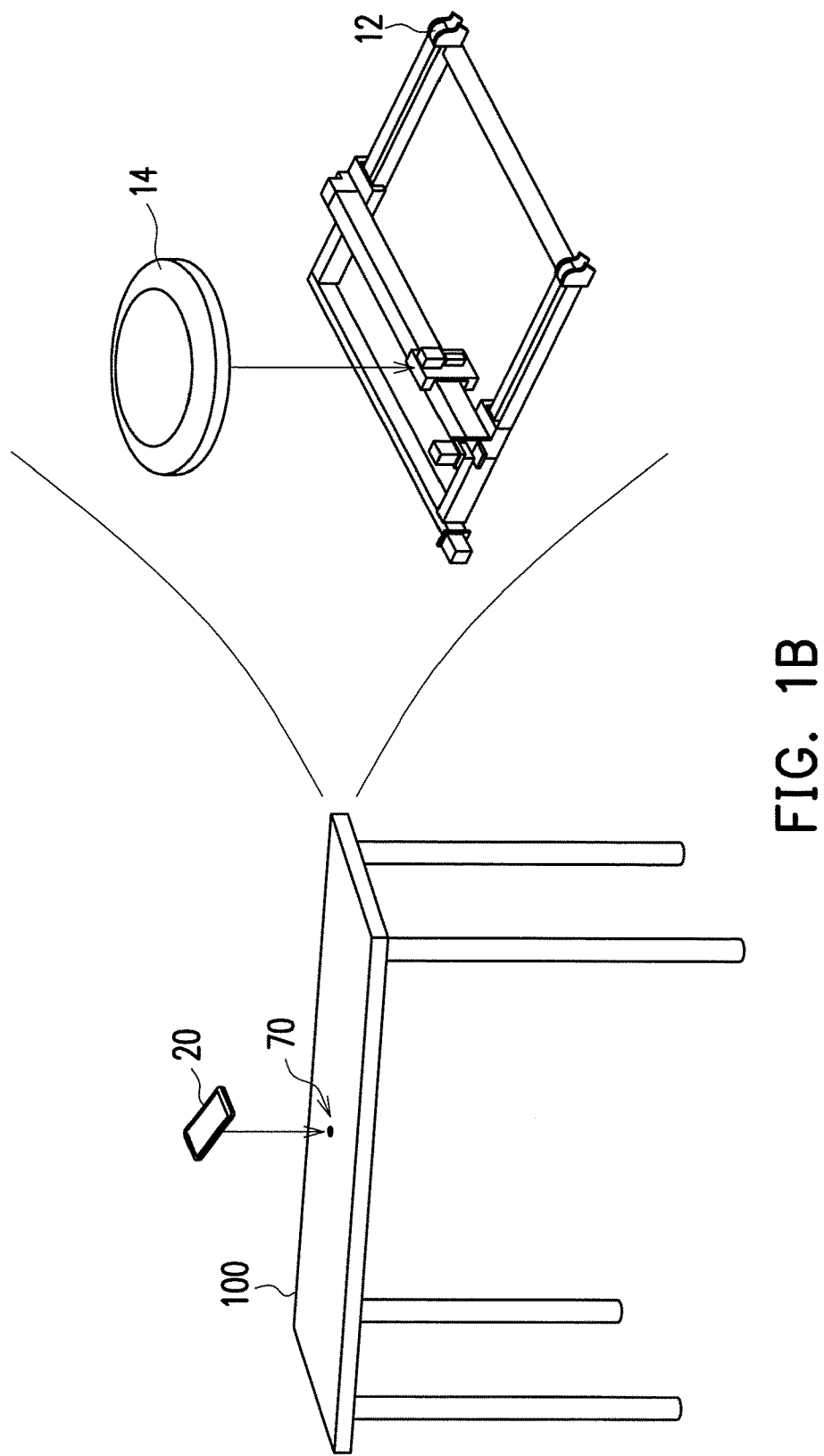

FIG. 1A and FIG. 1B are schematic diagrams illustrating a wireless charging system according to an embodiment of the invention.

Referring to FIG. 1A, a wireless charging system 1000 of the invention includes a processor 10, a moving platform 12, a wireless charging apparatus 14 and a sensor 16. The moving platform 12, the wireless charging apparatus 14 and the sensor 16 are respectively coupled to the processor 10.

The processor 10 may be a central processing unit (CPU), or other programmable general purpose or special purpose microprocessor, digital signal processor (DSP), programmable controller, application specific integrated circuit (ASIC) or other similar devices or a combination of the above devices.

The moving platform 12 may be a device used to carry the wireless charging apparatus 14 and move the wireless charging apparatus 14 on a two-dimensional (2D) plane or in a three-dimensional (3D) space according to a control signal of the processor 10. Namely, the moving platform 12 and the wireless charging apparatus 14 are connected with each other.

The wireless charging apparatus 14 may transmit energy to an electronic apparatus by means of near field induction in a wireless manner. The electronic apparatus, after receiving the energy sent by the wireless charging apparatus 14, may use the received energy to charge a battery or directly in an operation of the electronic apparatus. The energy is transmitted between the wireless charging apparatus and the electronic apparatus by means of inductive coupling, and thus, no wired connection is required therebetween.

The sensor 16 is used to sense the electronic apparatus and generate sensing information, such that the processor 10 may obtain a position where the electronic apparatus is located according to the sensing information. In the present exemplary embodiment, the sensor 16 may include at least one of an image capturing device, an infrared sensing device, a signal strength sensing device and a touch sensing device.

In the present exemplary embodiment, the wireless charging system 1000 further includes a storage unit (which is not shown). The storage unit stores a plurality of program code segments, and the program code segment, after being installed, are executed by the processor 10. For example, the storage unit may include a plurality of modules and various operations to be applied in the wireless charging system 1000 are respectively performed through these modules, where each of the modules is composed of one or a plurality of program code segments. However, the invention is not limited thereto, and each of the operations of the wireless charging system 1000 may be performed by implementation in other hardware forms.

Particularly, referring to FIG. 1B, in the present exemplary embodiment, the moving platform 12 and the wireless charging apparatus 14 are disposed in the placement platform 100. The placement platform 100 is, for example, a table. A user may place the electronic apparatus 20 to be charged at a position 70 on a placement plane (e.g., a tabletop) of the placement platform 100. The position 70 is, for example, any position on the placement plane of the placement platform 100. The sensor 10 (which is not shown in FIG. 1B) may sense the electronic apparatus 20 and generate sensing information. The processor 10 may send a control signal (which is also referred to as a first control signal) according to the sensing information. Then, the moving platform 12 may move the wireless charging apparatus 14 to the position 70 (which is also referred to as a first position) near the electronic apparatus 20 according to the first control signal. Thereby, the wireless charging apparatus 14 may wirelessly charge the electronic apparatus 20. Namely, the sensing information is used by the processor 10 to determine the position on the placement platform 100 where the electronic apparatus 10 is placed. After it is determined that the electronic apparatus 10 is placed at a position on the placement platform 100, the processor 10 may control the moving platform 12 to move the wireless charging apparatus 14 to the position near the electronic apparatus 10, thereby charging the electronic apparatus 10.

In addition, in an exemplary embodiment, the electronic apparatus 20 may also send charging information to trigger the aforementioned process before the charging operation. The processor 10 may control the sensor 16 to sense the electronic apparatus 10 according to the charging information to obtain the sensing information, such that the processor 10 may determine the position on the placement platform 100 where the electronic apparatus 10 is placed according to the sensing information.

Several embodiments are provided below to describe in detail how the processor 10 determines the position on the placement platform 100 where the electronic apparatus 10 is placed according to the sensing information.

In an embodiment, the sensor 10 may include at least one image capturing device. The image capturing device is, for example, a video camera or a camera using a charge coupled device (CCD) lens, a complementary metal oxide semiconductor transistors (CMOS) lens or an infrared lens. The image capturing device may be disposed, for example, directly above, obliquely above the placement platform 100 or at an edge of the placement platform 100, which is not limited herein.

The image capturing device may photograph the placement platform 100 to capture an image (which is also referred to as a first image) having the electronic apparatus 20. The processor 10 may perform object recognition according to the first image to obtain the position 70 on the placement plane of the placement platform 100 for placing the electronic apparatus 20. Thereafter, the processor 10 may send the control signal according to the obtained position 70. The moving platform 12 may move the wireless charging apparatus 14 to the position 70 near the electronic apparatus 20 according to the control signal, such that the wireless charging apparatus 14 may wirelessly charge the electronic apparatus 20.

In another embodiment, the sensor 16 may include at least one infrared sensing device. The infrared sensing device is, for example, disposed in the periphery of the placement platform 100. The infrared sensing device may be used to emit an infrared signal and receive a reflection signal of the infrared signal. When the infrared sensing device emits the infrared signal and receives the reflection signal reflected by the electronic apparatus 20, the processor 10 may obtain the position 70 on the placement plane of the placement platform 100 for placing the electronic apparatus 20 according to the infrared signal and the reflection signal. Thereafter, the processor 10 may send the control signal according to the obtained position 70. The moving platform 12 may move the wireless charging apparatus 14 to the position 70 near the electronic apparatus 20 according to the control signal, such that the wireless charging apparatus 14 may wirelessly charge the electronic apparatus 20.

In another embodiment, the sensor 16 may include at least one signal strength sensing device. The signal strength sensing device may be, for example, disposed together with the wireless charging apparatus 14 on the moving platform 12 and move together with the wireless charging apparatus 14 by the moving platform 12. In the present embodiment, the processor 10 may send a control signal (which is also referred to as a second control signal) to control the moving platform 12 to move the signal strength sensing device according to the second control signal. In the operation of the moving platform 12 moving the signal strength sensing device according to the second control signal, the signal strength sensing device may determine whether a signal strength (which is also referred to as a first signal strength) of a signal sent by the electronic apparatus 20 is sensed. The signal strength may be obtained through, for example, a received signal strength indication (RSSI). When the signal strength sensing device senses the first signal strength of the electronic apparatus 20, the processor 10 may send at least one control signal according to the first signal strength. The moving platform 12 may move the wireless charging apparatus 14 toward a direction where a strong signal strength is provided according to the control signal to get close to the position 70 of the electronic apparatus 20, such that the wireless charging apparatus 14 may wirelessly charge the electronic apparatus 20.

Specifically, in an embodiment, the processor 10 may control the signal strength sensing device to periodically move within the placement platform 100 to sense whether there is any electronic apparatus on the placement platform 100 that requires to be changed. However, in another embodiment, the moving platform 12 may not first move the signal strength sensing device. When the electronic apparatus 20 sends the charging information, the processor 10 may generate a control signal according to the charging information, the moving platform 12 may then move the signal strength sensing device according to the control signal to sense the electronic apparatus 20 on the placement platform 100 that requires to be charged.

In another embodiment, the sensor 16 may include at least one touch sensor. The touch sensor may be used to detect at least one touch on the placement platform. For example, the user may touch the position 70 on the placement plane of the placement platform 100 by a hand. In this circumstance, the touch sensor may sense the touch of the position 70 on the placement plane. The touch sensor may send a touch sensing signal according to the touch. The processor 10 may obtain where the position 70 is according to the touch sensing signal. Thereafter, the processor 10 may send a control signal according to the obtained position 70. The moving platform 12 may, according to the control signal, move the wireless charging apparatus 14 to the position 70 near the electronic apparatus 20, such that the wireless charging apparatus 14 may wirelessly charge the electronic apparatus 20.

Figure 2:
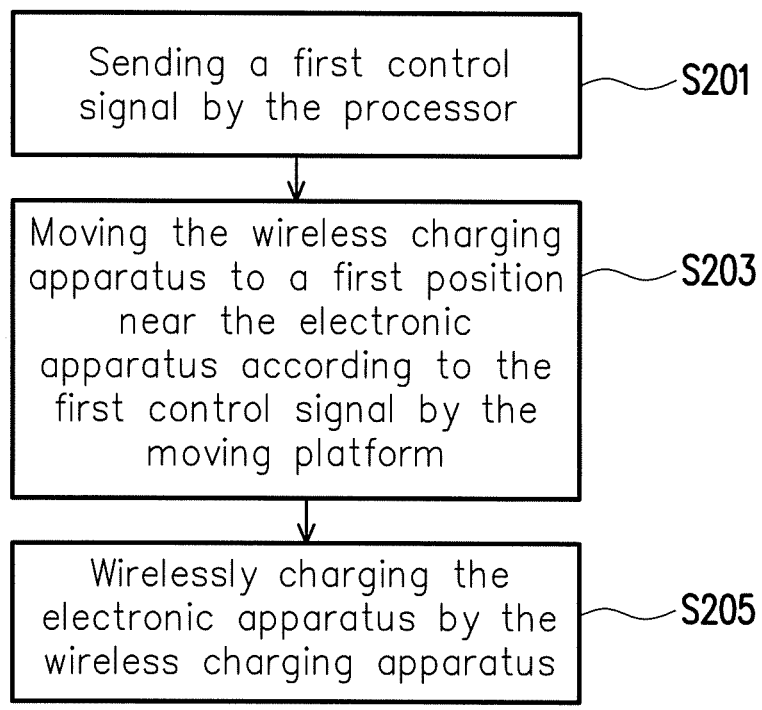
FIG. 2 is a schematic diagram illustrating a wireless charging method according to an embodiment of the invention.

FIG. 2 is a schematic diagram illustrating a wireless charging method according to an embodiment of the invention.

Referring to FIG. 2, in step S201, the processor 10 sends a first control signal. In step S203, the moving platform 12 moves the wireless charging apparatus 14 to a first position near the electronic apparatus 20 according to the first control signal. Lastly, in step S205, the wireless charging apparatus 14 wirelessly charge the electronic apparatus 20.

In light of the foregoing, in the wireless charging system and the wireless charging method provided by the invention, the wireless charging apparatus and the moving platform can be integrated into a placement platform. When the electronic apparatus is placed on the placement platform, the moving platform can move the wireless charging apparatus to a position near the electronic apparatus according to the control signal of the processor. Thereafter, the wireless charging apparatus can charge the electronic apparatus. In this way, the user, unknowing the position of the wireless charging apparatus, can directly place the cell phone on the placement platform for charging.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A wireless charging system, comprising:
a placement platform, comprising a placement plane for placing an electronic apparatus, wherein the placement platform is a table;
a wireless charging apparatus;
a moving platform, wherein the entire wireless charging apparatus is disposed on the moving platform and can be moved by the moving platform;
a sensor;
a processor, coupled to the wireless charging apparatus and the moving platform and the sensor, wherein
the sensor senses the electronic apparatus and generates sensing information,
the processor sends a first control signal according to the sensing information,
the moving platform moves the wireless charging apparatus to a first position near the electronic apparatus according to the first control signal, and
the wireless charging apparatus wirelessly charges the electronic apparatus,
wherein the sensor comprises a signal strength sensing device, wherein before the operation of sending the first control signal by the processor,
the processor sends a second control signal, and
the moving platform moves the signal strength sensing device according to the second control signal, and
in the operation of moving the signal strength sensing device according to the second control signal by the moving platform,
the signal strength sensing device determines where a strength of a signal emitted by the electronic apparatus is strong, and
wherein the processor sends the first control signal according to the strength of the signal emitted by the electronic apparatus such that the moving platform moves the wireless charging apparatus toward a direction where the strength of the signal emitted by the electronic apparatus is strong.

2. The wireless charging system according to claim 1, wherein the wireless charging apparatus and the moving platform are disposed in the placement platform.

3. The wireless charging system according to claim 1, wherein before the operation of the sensor sensing the electronic apparatus and generating the sensing information,
the electronic apparatus sends charging information, and
the processor controls the sensor to sense the electronic apparatus according to the charging information.

4. The wireless charging system according to claim 1, wherein the sensor comprises an image capturing device, and in the operation of the processor sending the first control signal,
the image capturing device captures a first image having the electronic apparatus,
the processor performs object recognition according to the first image to obtain the first position, and
the processor sends the first control signal according to the first position.

5. The wireless charging system according to claim 1, wherein the sensor comprises an infrared sensing device, and in the operation of the processor sending the first control signal,
the infrared sensing device emits an infrared signal,
the infrared sensing device receives a reflection signal of the infrared signal,
the processor obtains the first position according to the infrared signal and the reflection signal, and
the processor sends the first control signal according to the first position.

6. The wireless charging system according to claim 1, wherein the sensor comprises a touch sensor, and in the operation of the processor sending the first control signal,
the touch sensor senses a touch of the first position on the placement platform,
the touch sensor sends a touch sensing signal according to the touch,
the processor obtains the first position according to the touch sensing signal, and
the processor sends the first control signal according to the first position.

7. A wireless charging method for a wireless charging system, wherein the wireless charging system comprises a placement platform, a wireless charging apparatus, a moving platform, a sensor and a processor, the placement platform comprises a placement plane for placing an electronic apparatus, and the moving platform is connected with the wireless charging apparatus, wherein the placement platform is a table and the entire wireless charging apparatus is disposed on the moving platform and can be moved by the moving platform, the method comprising:

sensing the electronic apparatus and generating sensing information by the sensor;

sending a first control signal according to the sensing information by the processor;

moving the wireless charging apparatus to a first position near the electronic apparatus according to the first control signal by the moving platform; and wirelessly charging the electronic apparatus by the wireless charging apparatus, wherein the sensor comprises a signal strength sensing device, wherein before the step of sending the first control signal by the processor, the method further comprising:

sending a second control signal by the processor; and moving the signal strength sensing device according to the second control signal by the moving platform, and in the operation of the step of moving the signal strength sensing device according to the second control signal by the moving platform, determining where a strength of a signal emitted by the electronic apparatus is strong by the signal strength sensing device, and wherein sending the first control signal by the processor according to the strength of the signal emitted by the electronic apparatus such that the moving platform moves the wireless charging apparatus toward a direction where the strength of the signal emitted by the electronic apparatus is strong.

8. The wireless charging method according to claim 7, wherein the wireless charging apparatus and the moving platform are disposed in the placement platform.

9. The wireless charging method according to claim 7, wherein before the step of sensing the electronic apparatus and generating the sensing information by the sensor, the method further comprises:

sending charging information by the electronic apparatus; and controlling the sensor to sense the electronic apparatus according to the charging information by the processor.

10. The wireless charging method according to claim 7, wherein the sensor comprises an image capturing device, wherein the step of sending the first control signal by the processor comprises:

capturing a first image having the electronic apparatus by the image capturing device;

performing object recognition according to the first image to obtain the first position by the processor; and sending the first control signal according to the first position by the processor.

11. The wireless charging method according to claim 7, wherein the sensor comprises an infrared sensing device, and the step of sending the first control signal by the processor comprises:

emitting an infrared signal by the infrared sensing device;

receiving a reflection signal of the infrared signal by the infrared sensing device;

obtaining the first position according to the infrared signal and the reflection signal by the processor; and sending the first control signal according to the first position by the processor.

12. The wireless charging method according to claim 7, wherein the sensor comprises a touch sensor, and the step of sending the first control signal by the processor comprises:

sensing a touch of the first position on the placement platform by the touch sensor;

sending a touch sensing signal according to the touch by the touch sensor;

obtaining the first position according to the touch sensing signal by the processor; and sending the first control signal according to the first position by the processor.

* * * * *